(12) United States Patent
Takeda

(10) Patent No.: US 9,739,648 B2
(45) Date of Patent: Aug. 22, 2017

(54) DIAL STRUCTURE

(71) Applicant: CALSONIC KANSEI CORPORATION, Saitama (JP)

(72) Inventor: Yuuki Takeda, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 137 days.

(21) Appl. No.: 14/546,420

(22) Filed: Nov. 18, 2014

(65) Prior Publication Data

US 2015/0136015 A1    May 21, 2015

(30) Foreign Application Priority Data

Nov. 19, 2013    (JP) .................. 2013-238826

(51) Int. Cl.
| | | |
|---|---|---|
| *G01D 13/02* | (2006.01) | |
| *B60K 35/00* | (2006.01) | |
| *G09F 7/00* | (2006.01) | |
| *G04B 19/12* | (2006.01) | |

(52) U.S. Cl.
CPC ............ *G01D 13/02* (2013.01); *B60K 35/00* (2013.01); *G04B 19/12* (2013.01); *G09F 7/00* (2013.01)

(58) Field of Classification Search
CPC .......... G01D 13/02; B60K 35/00; G09F 7/00; G04B 19/12
USPC ......... 116/286–287, 298, 305, 334, DIG. 36; 362/26–30, 85
See application file for complete search history.

(56) References Cited

U.S. PATENT DOCUMENTS

| | | | | |
|---|---|---|---|---|
| 2,158,925 A | * | 5/1939 | Braswell ................ | G01P 1/11 116/286 |
| 2,272,806 A | * | 2/1942 | Klein ..................... | G04B 19/30 116/286 |
| 2,664,849 A | * | 1/1954 | Nallinger .............. | G01D 11/28 116/62.1 |
| 3,463,118 A | * | 8/1969 | Wood .................... | G04B 19/10 116/335 |
| 4,875,433 A | * | 10/1989 | Tsukamoto ........... | G01D 11/28 116/334 |
| 5,032,711 A | * | 7/1991 | Yamada ................ | G01D 7/04 250/461.1 |
| 5,395,678 A | * | 3/1995 | Matsushima ......... | G02F 1/133516 359/359 |
| 5,556,187 A | * | 9/1996 | Furuya ................. | B60Q 3/004 116/288 |
| 5,558,927 A | * | 9/1996 | Aruga .................. | G02B 5/201 359/589 |

(Continued)

FOREIGN PATENT DOCUMENTS

| | | | | |
|---|---|---|---|---|
| GB | 2072849 | * | 10/1981 | ............ G01D 13/02 |
| JP | 2003-113493 | | 4/2003 | |
| JP | 2010-271052 | | 12/2010 | |

*Primary Examiner* — R. A. Smith
*Assistant Examiner* — Tania Courson
(74) *Attorney, Agent, or Firm* — Wenderoth, Lind & Ponack, L.L.P.

(57) ABSTRACT

The dial structure includes a dial base having an optical transparency, on which a carbon pattern is formed, and an uneven portion formed on a front surface of the dial base. The uneven portion has a convex and concave form representing a convex and concave form of the carbon pattern. A background print layer is formed on a back surface of the dial base excluding a portion to be an indicator portion, and has a color tone of the carbon pattern.

5 Claims, 2 Drawing Sheets

(56) References Cited

U.S. PATENT DOCUMENTS

| | | | | |
|---|---|---|---|---|
| 5,703,612 A * | 12/1997 | Salmon | B60K 37/02 | 116/286 |
| 6,088,162 A * | 7/2000 | Someno | G02B 1/10 | 359/513 |
| 6,183,917 B1 * | 2/2001 | Sakamoto | G02B 5/201 | 349/106 |
| 6,511,194 B1 * | 1/2003 | Noll | G01D 11/28 | 116/286 |
| 6,817,310 B2 * | 11/2004 | Sugiyama | G01D 13/04 | 116/286 |
| 7,058,272 B2 * | 6/2006 | Bourdelais | G01D 5/34723 | 116/202 |
| 7,216,997 B2 * | 5/2007 | Anderson, Jr. | B60K 35/00 | 362/23.01 |
| 7,722,202 B2 * | 5/2010 | Tsurumi | B60K 35/00 | 116/288 |
| 7,752,992 B2 * | 7/2010 | Takeshige | B60K 37/02 | 116/286 |
| 7,934,463 B2 * | 5/2011 | Cook | B60K 35/00 | 116/286 |
| 8,826,846 B2 * | 9/2014 | Hori | G01D 11/28 | 116/286 |
| 2003/0121467 A1 * | 7/2003 | Furuya | G01D 11/28 | 116/286 |
| 2006/0092521 A1 * | 5/2006 | Birman | B60K 35/00 | 359/630 |
| 2009/0180272 A1 * | 7/2009 | Tsurumi | B60K 35/00 | 362/23.16 |
| 2009/0205559 A1 * | 8/2009 | Lia | G01D 13/22 | 116/271 |
| 2009/0233044 A1 * | 9/2009 | Sun | B29C 45/14811 | 428/113 |
| 2014/0064046 A1 * | 3/2014 | Amano | G04B 19/042 | 368/238 |
| 2015/0038034 A1 * | 2/2015 | Lukas | D02G 3/12 | 442/60 |
| 2016/0274541 A1 * | 9/2016 | Amano | G04B 19/12 | |

* cited by examiner

DIAL STRUCTURE

CROSS REFERENCE TO RELATED APPLICATION

The present application is based on and claims priority from Japanese Patent Application No. 2013-238826, filed on Nov. 19, 2013, the disclosure of which is hereby incorporated by reference in its entirety.

BACKGROUND OF THE INVENTION

Field of the Invention

The present invention relates to a dial structure used in an instrument.

Description of the Related Art

A vehicle such as an automobile is generally provided with an instrument which indicates various kinds of driving information. Japanese Laid-open Patent Application Publication No. 2003-113493 (Reference 1) and No. 2010-271052 (Reference 2) disclose such an instrument having a dial as a display surface whose back ground is a carbon pattern, for example.

In Reference 1, the carbon pattern of the dial is represented by printed color shading. In Reference 2, the carbon pattern is printed on a transparent layer.

However, the dial with the carbon pattern represented by printed color shading in Reference 1 has a lack of stereoscopic effect and high-class appearance. Likewise, in Reference 2, the dial is steric only by the thickness of the transparent layer so that it cannot provide a stereoscopic effect and high-class appearance sufficiently. Moreover, the transparent layer with the carbon pattern is applied on a print layer. Therefore, the carbon pattern cannot be applied on the print layer until the print layer is dried. Thus, there is a problem that it takes a longer time to manufacture the dial.

SUMMARY OF THE INVENTION

The present invention aims to produce a dial having a steric carbon pattern with high-class appearance in a short period of time.

According to one embodiment, a dial structure comprises a dial base having an optical transparency, on which a carbon pattern is formed. An even portion is formed on a front surface of the dial base, having a convex and concave form representing a convex and concave form of the carbon pattern. A background print layer is formed on a back surface of the dial base excluding a portion to be an indicator portion, having a color tone of the carbon pattern.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENT

Figure 1:
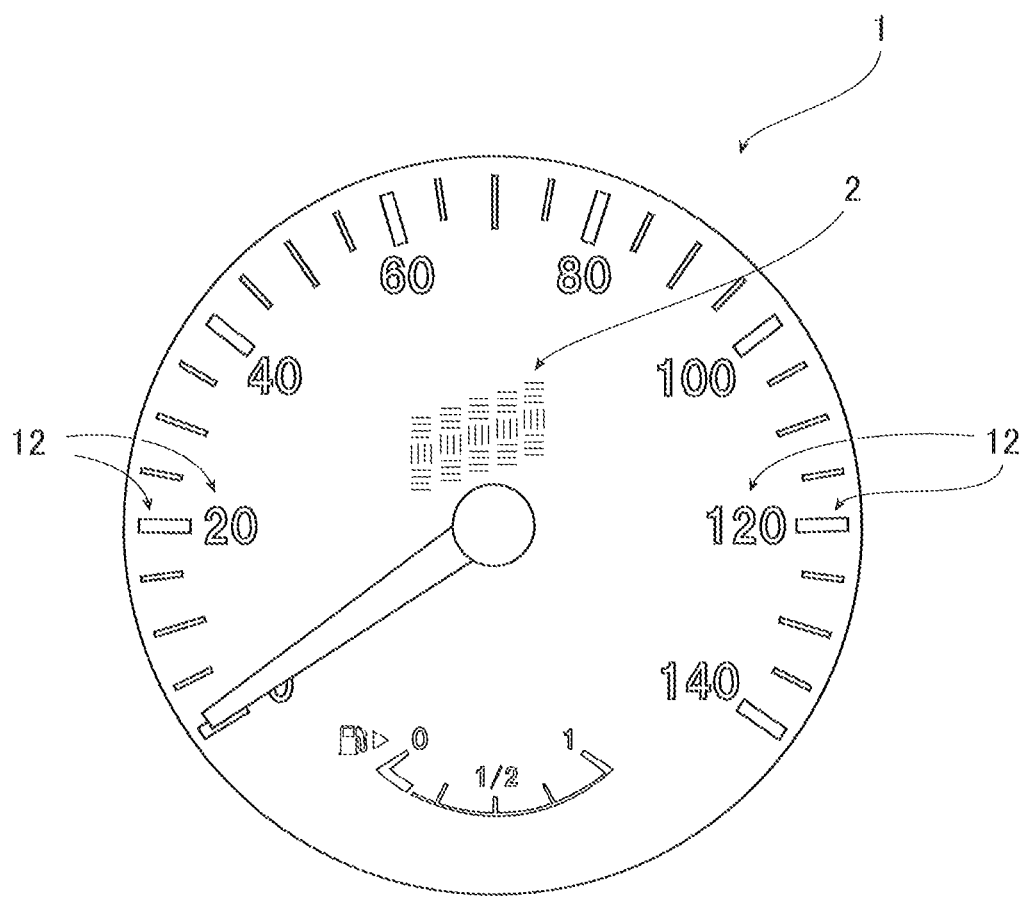
FIG. 1 is a front view of a dial as an example of a dial structure according to one embodiment of the present invention.

Hereinafter, an embodiment of the present invention will be described in detail with reference to the accompanying drawings, FIG. 1 to FIG. 3.

A dial structure according to the present embodiment is described in the following. An instrument is provided in a vehicle such as an automobile to display various kinds of driving information. FIG. 1 shows a dial 1 as a display surface of the instrument which includes a carbon pattern 2 on a background. The carbon pattern 2 is formed on a dial base 3 (FIG. 2) having an optical transparency.

The dial base 3 is for example a transparent sheet member made from resin such as a PP material or PC material with a thickness of 0.5 mm. However, the material and thickness of the dial base 3 should not be limited to such an example. Note that the carbon pattern 2 is a pattern of carbon fiber textile.

Figure 2:
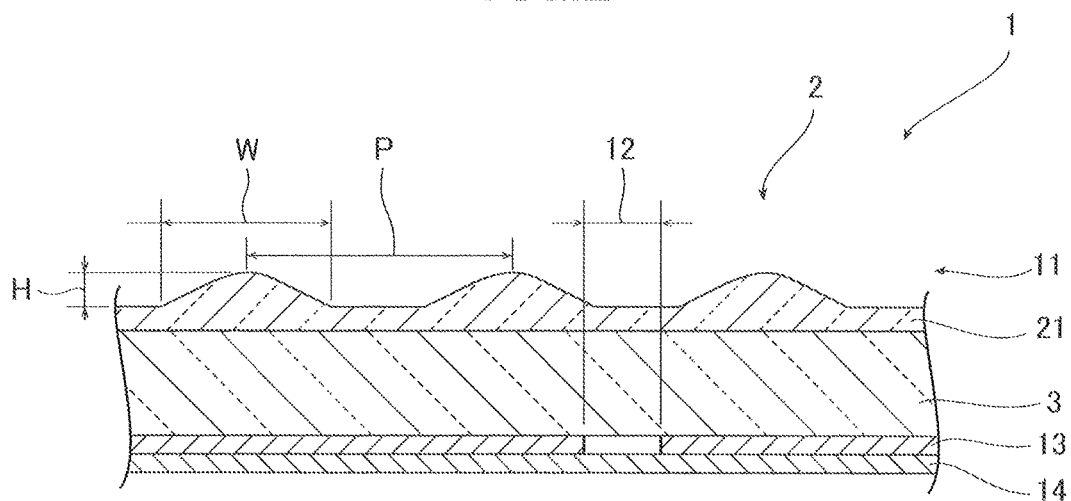
FIG. 2 is an enlarged vertical cross section view of a part of the dial in FIG. 1.

As shown in FIG. 2, the dial 1 comprises an uneven portion 11 representing a convex and concave form of the carbon pattern 2 on the front surface of the dial base 3. A background print layer 13 having a color tone of the carbon pattern 2 is formed on the back surface of the dial base 3 except for the indicator portion 12.

Herein, the front surface refers to an outer surface while the back surface refers to an inner surface. The uneven portion 11 is formed in a such manner that a real carbon fiber is evoked. Further, the uneven portion 11 can be directly formed on the dial base 3 at line width W of 105.8 μm, pitch P of 199.7 μm and height H of 33.93 μm, for example. However, the line width, and pitch and height thereof are not limited to such values.

The indicator portion 12 is a numeric value indicator or a scale display, for example. The uneven portion 11 can be provided on a portion of the dial base 3 to be the indicator portion 12 or be provided on the entire surface of the dial base 3 including the indicator portion 12. The background print layer 13 is a non-translucent print layer formed with dark color paint as black, gray, or metallic (gunmetal) color of black or grey mixed with metallic paint. These colors can be separately applied on the different parts of the background print layer 13. Moreover, the background print, layer 13 can be multi-layered and the above color paints can be appropriately combined and applied on the multi-layers.

A print layer does not need to be formed at least on a portion to be the indicator portion 12 on the back surface of the dial base 3. However, it is preferable to form, on the portion to be the indicator portion 12, a print layer 14 through which illumination can be transmitted. The print layer 14 is optically transparent or semi-transparent and formed with bright color paint such as white, orange, or red. The print layer 14 can be partially applied only on a portion to be the indicator portion 12 or applied onto the entire back surface of the dial base 3 from the back side of the background print layer 13.

Further, a sheet member 21 is adhered on the front surface of the dial base 3. In this case the uneven portion 11 is formed on the sheet member 21.

Herein, a sheet member on which the uneven portion 11 is formed in advance can be used as the sheet member 21. Alternatively, it can be a thermal transfer sheet so that the uneven portion 11 of the carbon pattern 2 is formed by use of a heated mold and thermally transferred onto the dial base 3 concurrently.

Figure 3:
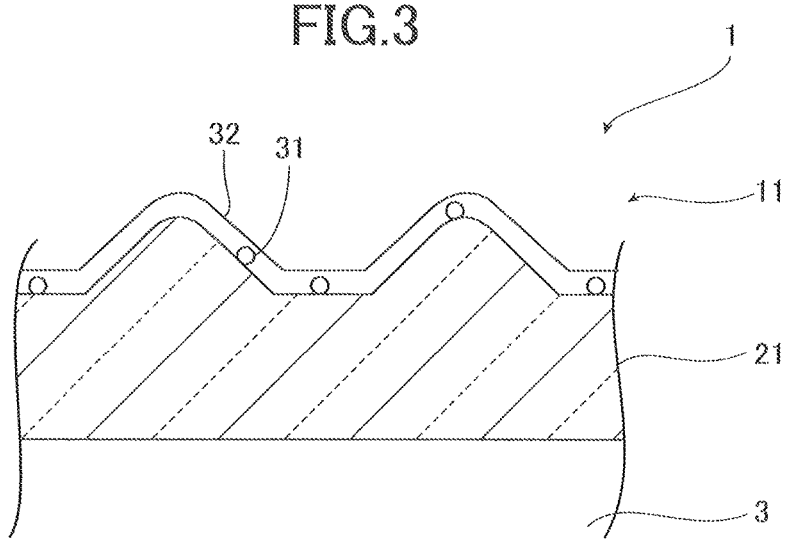
FIG. 3 is an enlarged vertical cross section view of a sheet member of FIG. 2.

Moreover, as shown in FIG. 3, a hard coating 32 is applied onto the front surface of the uneven portion 11. The hard coating 32 is compounded with a matting agent 31.

The matting agent 31 is for example a granulated mat material and the particles thereof are smaller than those of the uneven portion 11. The matting material has a particle diameter of 7 μm and is combined with the hard coating 32 at a ratio of 1.5%. The particle size and combination ratio should not be limited to such values. The hard coating 32 is transparent paint to cure the front surface of the uneven portion 11.

Next, the effects of the present embodiment are described. By forming the carbon pattern 2 on the dial base 3 with optical transparency, the dial 1 appears as if it were made from a carbon material as a high-functional material. The dial base 3 is advantageous in that it is more easily processed and more manageable than a real carbon material.

According to the present embodiment the uneven portion 11 representing the uneven shape of the carbon pattern 2 is formed on the front surface of the dial base 3. Thereby, a large difference in height of the uneven portion 11 produces stereoscopic effects and the carbon pattern 2 can stand out sharply due to the stereoscopic effects. The dial 1 with a good finish close to a real carbon material can be provided. Further, the uneven portion 11 can provide a good texture which induces a user to touch, and the dial 1 with an excellent touch close to a touch of a carbon material can be realized.

Moreover, the background print layer 13 with a color tone of the carbon pattern 2 is formed on the back surface of the dial base 3. Thereby, the uneven portion 11 on the front surface of the dial base 3 is not covered with the print layer so that a difference in height of the uneven portion 11 can be maintained. Thus, the sharply standing-out carbon pattern 2 can be obtained.

Further, since the uneven portion 11 and the background print layer 13 are separately formed on the front and back surfaces of the dial base 3, the carbon pattern can appear authentic by interaction between the background print layer 13 and uneven portion 11 even if the background print layer 13 is solidly painted with single-color paint. This eliminates the necessity for representing the carbon pattern 2 by color shading, making it possible to reduce printing costs. Furthermore, the uneven portion 11 and the background print layer 13 are separately formed on the different surfaces of the dial base 3. Thereby, it is made unnecessary to wait for the print layer 13 to dry out, for example, to form the uneven portion 11 on the background print layer 13.

In addition the uneven portion 11 and the background print layer 13 are separated by the thickness of the dial base 3. Stereographical effects from the thickness of the dial base 3 can be also obtained.

Moreover, it is made possible to print a design which is applicable only on the back side such as mirror-like design on the background print layer 13.

Further, the background print layer 13 is formed on the back surface of the dial base 3. Therefore, it can be protected by the dial base 3 and the front side thereof is prevented from being damaged. It is thus possible to prevent a degradation of the background print layer 13 over time.

Further, the print layer can be formed on a portion to become the Indicator portion 12 on the back surface of the dial base 3. This makes it possible to provide the indicator portion 12 so that it is clearly visible on the carbon pattern 2.

As described above the steric dial 1 with a high-class appearance having the accentuated carbon pattern 2 can be acquired in a short period of time while the function of the dial 1 is maintained.

Further, the sheet member 21 on which the uneven portion 11 is formed is adhered on the front surface of the dial base 3. Thus, the uneven portion 11 with a large difference in height can be easily formed on the front surface of the dial base 3 at low cost.

Further, the hard coating 32 containing the matting agent 31 is applied on the surface of the uneven portion 11. Thereby, the hard coating 32 can prevent the dial base 3 and the uneven portion 11 from being damaged, and the matting agent reduces uniform gloss of the hard coating 32 and makes use of natural gloss and shades of the material of the carbon pattern 2. Thus, it is able to realize a clear and good-looking dial 1 with the carbon pattern 2 close to a real carbon material.

According to the present embodiment, it is made possible to manufacture a steric and high-class looking dial 1 with the accentuated carbon pattern 2 in a short period of time while the function of the dial 1 is maintained.

Although the present invention has been described in terms of exemplary embodiments, it is not limited thereto. It should be appreciated that variations or modifications may be made in the embodiments described by persons skilled in the art without departing from the scope of the present invention as defined by the following claims. Further, structures shown in the drawings should be considered to be included in the scope of the present invention.

What is claimed is:

1. A dial structure for a vehicle display, the dial structure comprising:
   a dial base of a vehicle display, the dial base having an optical transparency;
   an uneven portion formed on an entire front surface of the dial base, the uneven portion being entirely optically transparent and having convex and concave portions formed to represent convex and concave portions of a carbon pattern, the carbon pattern being a pattern of carbon fiber textile; and
   a background print layer formed on a back surface of the dial base excluding a portion to be an indicator portion, the background print layer having a color tone of the carbon pattern.

2. The dial structure according to claim 1, further comprising a sheet member adhered onto the front surface of the dial base, wherein the uneven portion is formed on the sheet member.

3. The dial structure according to claim 1, wherein a hard coating combined with a matting agent is applied to a surface of the uneven portion.

4. The dial structure according to claim 2, wherein a hard coating combined with a matting agent is applied to a surface of the uneven portion.

5. The dial structure according to claim 1, wherein the background print layer is non-translucent.

* * * * *